(12) United States Patent
Meter (10) Patent No.: US 9,060,497 B2
(45) Date of Patent: Jun. 23, 2015

(54) METHOD FOR BROODING OR GROWING POULTRY

(75) Inventor: Tjitze Meter, Veenendaal (NL)

(73) Assignee: Hatchtech Group B.V., Veenendaal (NL)

( * ) Notice: Subject to any disclaimer, the term of this patent is extended or adjusted under 35 U.S.C. 154(b) by 211 days.

(21) Appl. No.: 13/642,480

(22) PCT Filed: Apr. 20, 2010

(86) PCT No.: PCT/NL2010/050203
§ 371 (c)(1),
(2), (4) Date: Dec. 28, 2012

(87) PCT Pub. No.: WO2011/133020
PCT Pub. Date: Oct. 27, 2011

(65) Prior Publication Data
US 2013/0104809 A1     May 2, 2013

(51) Int. Cl.
*A01K 43/00* (2006.01)
*A01K 31/19* (2006.01)
(Continued)

(52) U.S. Cl.
CPC ............... *A01K 31/19* (2013.01); *A01K 31/18* (2013.01); *A01K 31/20* (2013.01)

(58) Field of Classification Search
CPC ..... A01K 31/00; A01K 31/002; A01K 31/17; A01K 31/18; A01K 31/19; A01K 31/20; A01K 45/00; A01K 45/005; A01K 45/007

USPC ........... 119/6.6, 6.8, 300, 301, 302, 304, 305, 119/306, 307, 311, 315, 316, 317, 322; 426/614
See application file for complete search history.

(56) References Cited

U.S. PATENT DOCUMENTS

| 2,137,996 | A | * | 11/1938 | Crawford ...................... 165/223 |
| 2,630,098 | A | | 3/1953 | Waniewski et al. |
| 2,791,199 | A | | 5/1957 | Hamnett |

(Continued)

FOREIGN PATENT DOCUMENTS

| EP | 1 104 987 B1 | 3/2004 |
| FR | 1468142 A | 2/1967 |

(Continued)

OTHER PUBLICATIONS

Craig, et al. "Recommended methods for the preconditioning of Odourous air prior to treatment in organic biofilters", NCEA, Feb. 24, 2004, 19 pgs.

(Continued)

*Primary Examiner* — Rob Swiatek
*Assistant Examiner* — Ebony Evans
(74) *Attorney, Agent, or Firm* — Gilberto M. Villacorta; Sunit Talapatra; Foley & Lardner LLP (57) ABSTRACT

The invention relates to a method for brooding or growing poultry, wherein eggs of the first 3-5 layings of young animals, preferably hens younger than 29 weeks, usually starting from about 26 weeks, are collected and are hatched together, directly after hatching the hatched chicks are provided in crates with about 10-500 animals arranged in stacks in an incubator chamber, in which incubator chamber food and drinking are provided to each crate and the temperature, humidity, $CO_2$ level and flow rate of air are controlled.

20 Claims, 6 Drawing Sheets

(51) Int. Cl.
*A01K 31/18* (2006.01)
*A01K 31/20* (2006.01)

(56) References Cited

U.S. PATENT DOCUMENTS

| | | | |
|---|---|---|---|
| 2,997,021 A | 8/1961 | Bailey | |
| 3,035,920 A | 5/1962 | Knodt | |
| 3,038,443 A * | 6/1962 | Miller | 119/300 |
| 3,225,740 A * | 12/1965 | Orr, Jr. | 119/322 |
| 3,240,000 A | 3/1966 | Hayes et al. | |
| 3,396,702 A | 8/1968 | Trussell | |
| 3,396,703 A | 8/1968 | Trussell | |
| 3,820,507 A | 6/1974 | Dugan et al. | |
| 4,378,758 A | 4/1983 | Coleman | |
| 4,606,299 A | 8/1986 | Grumbach | |
| 4,862,831 A | 9/1989 | Graham | |
| 5,657,720 A * | 8/1997 | Walters | 119/317 |
| 5,709,167 A * | 1/1998 | Kelley | 119/61.5 |
| 5,718,628 A | 2/1998 | Nakazato et al. | |
| 6,708,755 B1 | 3/2004 | Meter | |
| 7,861,673 B2 | 1/2011 | Huisinga et al. | |
| 8,272,352 B2 * | 9/2012 | Hendel | 119/322 |
| 2004/0028115 A1 | 2/2004 | Meter | |
| 2007/0245973 A1 | 10/2007 | Huisinga et al. | |
| 2011/0000437 A1 | 1/2011 | Meter | |
| 2011/0094452 A1 | 4/2011 | Huisinga et al. | |

FOREIGN PATENT DOCUMENTS

| | | |
|---|---|---|
| WO | WO 99/11145 A1 | 3/1999 |
| WO | WO-00/08922 A1 | 2/2000 |
| WO | WO-02/39812 A1 | 5/2002 |
| WO | WO-2004/047527 A1 | 6/2004 |
| WO | WO-2005/070198 A1 | 8/2005 |
| WO | WO-2007/142511 A1 | 12/2007 |
| WO | WO-2009/014422 A1 | 1/2009 |
| WO | WO-2009/116851 A1 | 9/2009 |

OTHER PUBLICATIONS

International Search Report for PCT/NL2010/050208—mailed Dec. 27, 2010.
International Search Report in PCT/NL2008/050111 dated Feb. 4, 2009.
International Search Report in PCT/NL2010/050210 dated Dec. 29, 2010.
International Search Report mailed Feb. 16, 2011 in Internation Appln. No. PCT/NL2010/050203.

* cited by examiner

METHOD FOR BROODING OR GROWING POULTRY

BACKGROUND

The current invention relates to a method for brooding or growing poultry.

The applicant of the current invention over the years devised several improvements in systems and devices, climate chambers and/or incubators, for hatching egg and breeding or growing or rearing the hatched chicks.

It is for instance referred to patent application WO-02/39812 of applicant, relating to a method of controlling the temperature in a controlled climate chamber. In this application, applicant in general refers to eggs of 28 weeks old mother animals which are usually small, about 45-50 gr. In a climate-controlled hatching chamber, the flow of air around such small eggs would be different than the flow of air around larger eggs of for instance 70 gr. It is further stated that the embryos in these small eggs will be smaller and lighter than embryos in larger eggs. This, however, was already know in the art: U.S. Pat. No. 4,378,758 already indicates that such smaller embryos remain much smaller further on in the process. It was up to now therefore uneconomical to use these eggs for high volume production of broiler poultry. In fact, in the past it was found that most if not all of these specific chicks would die.

Patent application WO-04047527 of applicant relates to a method for cleaning an incubator, and a particular layout of such an incubator.

WO 2007/142511 relates to a method and device for the hatching of eggs. In this application, trays with eggs are pivoted during hatching.

Applicant even suggested, for instance in WO-2005/070198, to maintain hatched chicks in a climatized room for a longer period after hatching, in order to improve growth and in general the brooding of poikilothermic poultry. To that end, applicant devised a further improved climate chamber or incubator, disclosed in WO-2009/014422. That application relates to a heat exchanger, a climate chamber provided with the heat exchanger and use of a climate chamber. In particular, a large part of this latest filing is incorporated in this patent application.

The developments of the applicant of the current patent application have considerably improved chambers for hatching and for brooding poultry directly after hatching, the poikilothermic stage.

Applicant, in view of these considerable improvements of climate chambers and hatching climate chambers, have found further improvements in the breeding of poultry.

SUMMARY OF THE INVENTION

The objective of the current invention is to improve the breeding of poultry, and in particular to increase the output of climate chambers, while on the other hand improving the wellbeing of the animals.

To that end, the invention relates to a method according to claim 1.

It was found that when controlling these environmental parameters in a climate chamber, in particular in a climate chamber or incubator chamber as described in WO-2009/01442, that it was possible to grow the chicks from the first eggs of hens. In the past, it was found impossible to grow these chicks from the first eggs, in Dutch sometimes also called "kanteieren". As explained above, these eggs are much smaller than the regular eggs laid by the same type of hens. Therefore, these first eggs were not hatched. These eggs were not used further in the process of brooding poultry. It was found that the chicks of these first eggs of young hens would normally die, usually in the first days, and otherwise further in the process. Due to the improvement environmental control of the climate chamber of WO 2009/014422, which application is referred to as if fully set forth in this description, it was found to the surprise of applicant that conditions can be provided to economically grow these chicks.

In particular, in a method for growing the chick after hatching, the chicks are exposed to the following temperature in the incubator device for poultry:

| Time after hatching (hours) | Temperature (° C.) chicks from young hens | Temperature (° C.) Usual |
|---|---|---|
| 0 | 36.94 | 36.94 |
| 6 | 36.94 | 36.39 |
| 12 | 36.67 | 35.83 |
| 24 | 36.11 | 35.0 |
| 36 | 35.28 | 34.17 |
| 48 | 34.17 | 33.06 |
| 60 | 33.06 | 31.94 |
| 72 | 31.94 | 30.83 |
| 84 | 30.83 | 29.72 |
| 96 | 30.00 | 28.89 |
| 108 | 29.44 | 28.33 |

In the dependant claims, specific temperature ranges are indicated which allow these particular chicks to grow. It can be notices that in fact this means that after 24 hours the temperature remains at least about 0.5° C. above the regular temperature. In fact, it was found beneficial if the temperature would be at least about 1.0° C. above the regular temperature. On the other hand, it was found that from 24 hours up to 108 days the temperature is to remain no more than about 2.0° C. above the usual temperature. In fact, the temperature is to remain no more than about 1.5° C. above the usual temperature. In a specific embodiment, the temperature is to remain between about 1.0-1.2° C. above the usual temperature.

In fact, it was found possible to grow the chicks in such a way that after several days, usually about 3-5 days after hatching, the chicks would have the same size (weight) as regular chicks.

The chicks which are to be kept in the incubator chamber and which result from the eggs of young hens especially in their first days are much smaller than regular hens.

In the past, most if not all of these chicks would die. As these chicks are much smaller, it was found that special provisions were needed in the incubator chamber. These provisions were never found necessary earlier as most if not all of these chicks would die.

Embodiments of the invention are provided in the dependent claims.

The invention further pertains to an apparatus comprising one or more of the characterising features described in the description and/or shown in the attached drawings. The invention further pertains to a method comprising one or more of the characterising features described in the description and/or shown in the attached drawings.

The invention further pertains to a method for growing poultry using a broiler house according to claim 9. In this embodiment, the chicks were found to develop for instance better feathers in particular due to careful temperature control. Furthermore, the climate chamber of WO 2009/014422 provides an incubator quality environment control. Therefore, in this description it will also be referred to as an incubator chamber. In particular it was found that this allows the temperature in the broiler house at a later stage to be set lower. In particular, the following temperature control was possible.

| day | traditional broiler house | broiler house after WO2009/014422 |
|---|---|---|
| 0 | 34 | — |
| 1 | 34 | — |
| 2 | 33 | — |
| 3 | 32 | — |
| 4 | 31.5 | 29 |
| 5 | 30.5 | 28.5 |
| 6 | 30 | 28 |
| 7 | 29.5 | 27.5 |
| 8 | 29 | 27 |
| 9 | 28.5 | 26.5 |
| 10 | 28 | 26 |
| 11 | 27.5 | 25.5 |
| 12 | 27 | 25 |
| 13 | 26.5 | 24.5 |
| 14 | 26 | 24 |
| 15 | 25.5 | 23.5 |
| 16 | 25 | 23 |
| 17 | 24.5 | 22.5 |
| 18 | 24 | 22 |
| 19 | 23.5 | 21.5 |
| 20 | 23 | 21 |
| 21 | 22.5 | 20.5 |
| 22 | 22 | 20.5 |
| 23 | 21.5 | 20.4 |
| 24 | 21 | 20.4 |
| 25 | 20.5 | 20.3 |
| 26 | 20 | 20.3 |
| 27 | 20 | 20.2 |
| 28 | 20 | 20 |
| 29 | 20 | 19.9 |
| 30 | 20 | 19.7 |
| 31 | 20 | 19.6 |
| 32 | 19.5 | 19.5 |
| 33 | 19.5 | 19.5 |
| 34 | 19.5 | 19.5 |
| 35 | 19.5 | 19.5 |
| 36 | 19 | 19.1 |
| 37 | 19 | 18.7 |
| 38 | 18.5 | 18.5 |
| 39 | 18.5 | 18.5 |
| 40 | 18 | 18.3 |
| 41 | 18 | 18 |
| 42 | 18 | 17.7 |
| 43 | 17.5 | 17.5 |

In fact, it was found that up until about the 21th day, the temperature in the broiler house can be kept up to about 1-3 degrees below the usual temperature in a broiler house. In particular, in a broiler house usually the temperature is lowered starting from the $4^{th}$ day with about 0.5° C. per day up to about 20.5° C. on the $21^{st}$ day and them more slowly to about 17.5° C. on the $43^{rd}$ day. In the current invention, it was found that after using the incubator chamber for the first 4 days after hatching, the temperature could be lowered up more than 1° C. with respect to the usual temperature. In particular, it was found that the temperature could be lowered more than 1.5° C. below the usual temperature. It was even found that the temperature could be lowered more than 2° C. below the usual temperature. Thus, chick according to that aspect of the invention start at about 30-33° C. at day 4. In an embodiment, they start at a temperature of about 31-32° C. After that the temperature can be lowered daily to about 19-22 degrees after 21 days. In particular, the temperature is lowered to about 20-21° C. after 21 days. In fact, usually the temperature is lowered with about 0.5° C. per day up to about 20-21° C. It should be noted that the temperature indications in for the broiler house are less accurate than in the incubator chamber. In a broiler house, the climate conditions are more difficult to maintain. There can be temperature differences from one place near the broiler floor to the next place near the broiler floor. The skilled person will be able, based upon the information in this document, to appreciate how to work the invention. When using the incubator chamber subsequent to hatching for another 4-10 days, in an embodiment for 3-5 days, in particular for about 4 days, it was found that the chicks develop better. The feathers all around the chicks are better developed. Thus, it was found that this allows the broiler house temperatures to be kept lower than usual, thus saving on heating costs, for instance. In fact, raising the temperature to usual levels may even lead to overheating the chicks.

The various aspects discussed in this patent can be combined in order to provide additional advantages. Furthermore, some of the features can form the basis for one or more divisional applications

DESCRIPTION OF THE DRAWINGS

The present invention in particular uses a climate chamber or incubator chamber, also disclosed in WO-2009/014422, in particular modified for the current method, to grow chicks after they hatch described below in more detail with reference to an example illustrated diagrammatically in the drawing, in which.

DETAILED DESCRIPTION OF EMBODIMENTS

Directly after hatching, the chicks are preferably reared in a climate chamber or incubation chamber of the type described below. First, a heat exchanger for such a chamber will be described. In an embodiment, it has troughs for providing drinks to the chicks, and can even have integrated lighting. The chicks are in the climate chamber provided in stacks of crates, described further on in this description. These crates have been modified to accommodate the chicks of the young mother animals, like young hens of less than 29 weeks old. Usually, the hens are from about 26 weeks old. The first 3-5 layings of these hens are only about 45-50 grams. It was found that the particular controlled conditions in the climate chamber of incubator chamber further described below allow these particular chicks to be brooded in an economical way.

Figure 1:
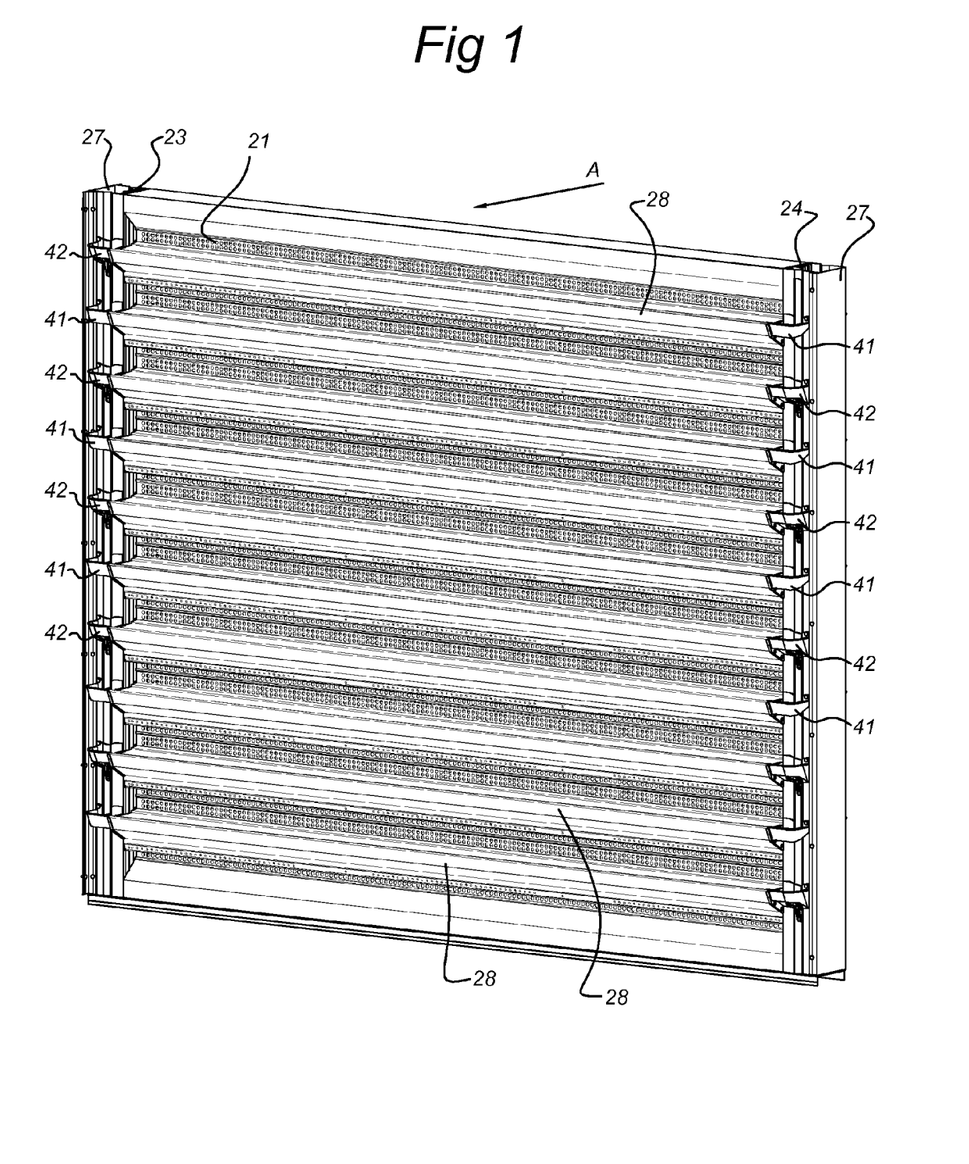
FIG. 1 shows a perspective view of a heat exchanger according to the invention.
Figure 2:
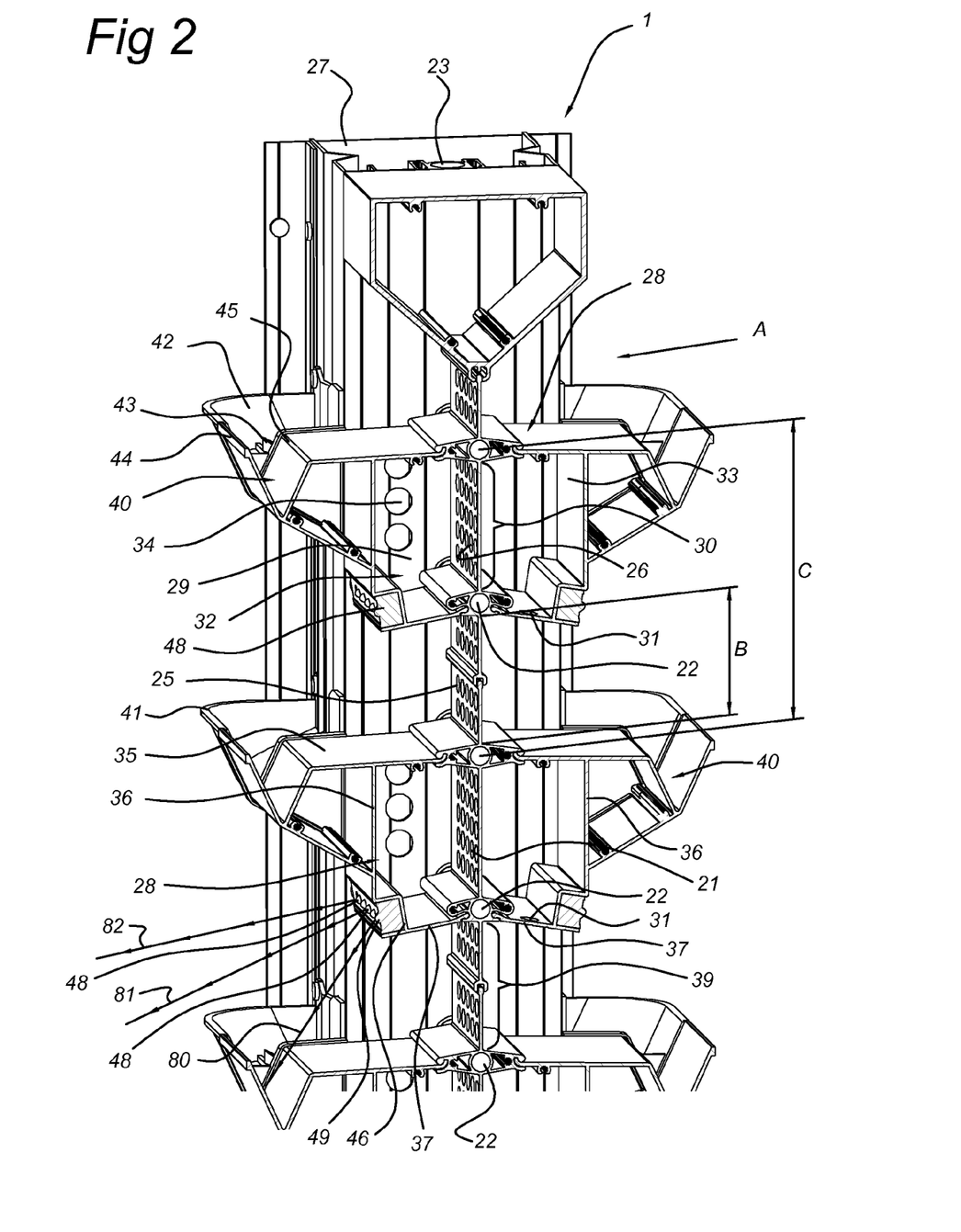
FIG. 2 shows a cross-sectional perspective view of a part of the heat exchanger from FIG. 1.
Figure 3:
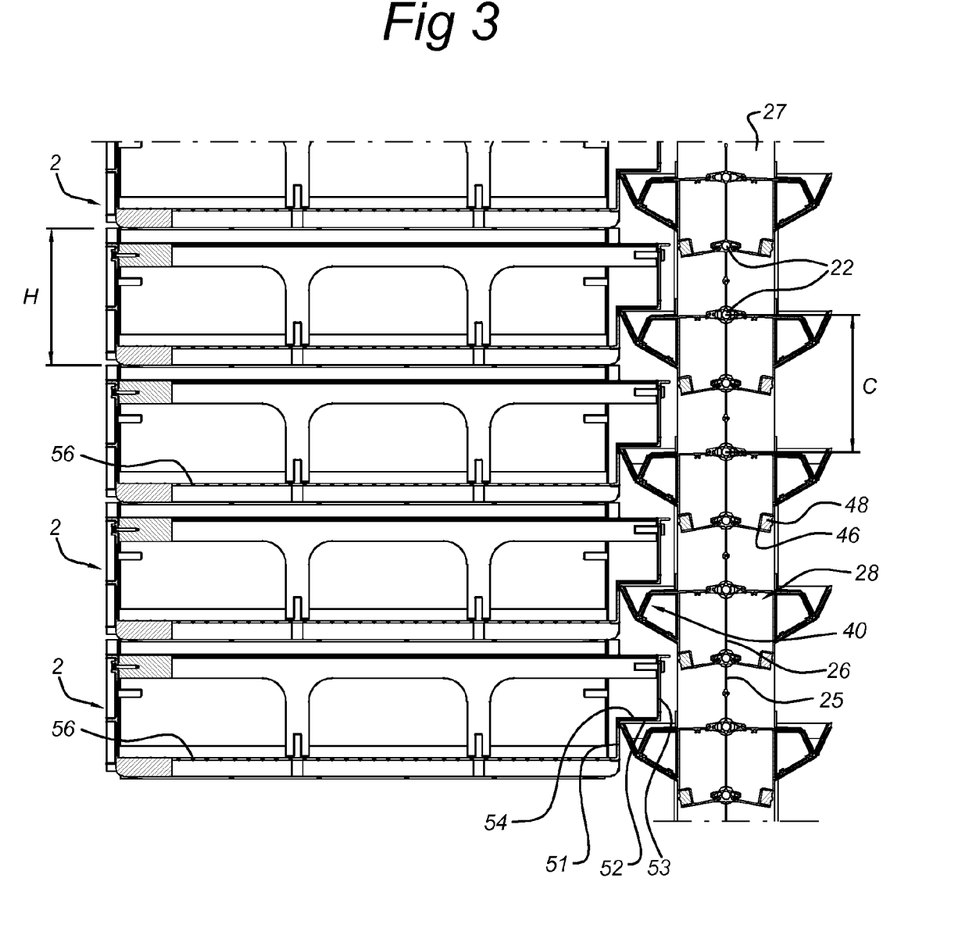
FIG. 3 shows a cross-sectional side view of a part of the heat exchanger from FIG. 1 together with part of a stack of crates.

FIGS. 1, 2 and 3 show a heat exchanger for use in a climate chamber. This heat exchanger is constructed around a panel-shaped body 21 having one or more fluid lines 22. The panel-shaped body 21 is provided with perforations 25 and 26.

These perforations make it possible for a gas stream (arrow A) to pass through the panel-shaped body 21 in a direction transverse to the panel-shaped body 21. Similarly to a radiator, the panel-shaped body 21 can be brought to a specific temperature by means of the fluid flowing through the one or more fluid lines. The one or more fluid lines extend between a feed line and a discharge line for said fluid. The panel-shaped body and the fluid lines will usually be made of a metal and form an integral part of one another (for example by being welded to one another, soldered to one another or by extruding the lines and the body in a single operation to form a single extrusion profile). Such a heat exchanger, as described above with reference to FIGS. 1, 2 and 3, can also be seen in FIGS. 3 and 4 of WO 00/08922. According to the invention, this (known) heat exchanger is additionally provided, in particular, with gassing ducts 28.

The gassing ducts 28 run parallel to one another and along the panel-shaped body 21. The gassing ducts 28 are fed by one or more medium supply ducts 27 and are connected thereto by passage openings 34. As can be seen in FIG. 1, a tubular medium supply duct 27 is provided along opposite sides of the panel-shaped body 21 so that the gassing ducts 28 can be supplied with medium from two sides simultaneously. The gassing ducts 28 extend between the latter and transversely to the medium supply ducts 27. The gassing ducts 28 are provided at a centre-to-centre distance C from one another in such a manner that in each case one intermediate zone 39 of the panel-shaped body 21 remains clear between two gassing ducts 28 situated one above the other. The height B of this intermediate zone 39 may be, for example, 7 to 10 cm, such as approximately 8.5 cm in this embodiment. The gas stream A can pass through the panel-shaped body 21 via the perforations 25 in this intermediate zone 39.

Each gassing duct 28 has an interior 29 which is delimited by a top wall 35, a bottom wall 37 and two side walls 36. The panel-shaped body 21 in each case extends with a part 30 through the gassing duct 28, which part forms a partition, as it were, which divides the gassing duct 28 into a first duct compartment 32 and a second duct compartment 33. Both compartments extend along the entire length of the gassing duct 28 and are in this case of equal size and shape. However, the duct compartments do not have to be of equal size and shape. It is also conceivable for there to be only one compartment if the panel-shaped body delimits a side wall of the gassing duct, for example, if the part 30 has been cut away, for example, or if the gassing duct has been placed against or close to the panel-shaped body on the outside of the panel-shaped body.

In order to ensure that the medium supplied via the gassing ducts 28 flows out along the panel-shaped body 21, distributed in the surrounding area, in particular the gas stream directed transversely to the panel-shaped body 21, each gassing duct 28 is provided with outflow openings 31 arranged over the length of said gassing duct in a distributed manner. By varying the size of these outflow openings 31 and/or the distance between adjacent outflow openings 31, an even delivery along the entire length of the gassing duct 28 can be achieved. In the embodiment illustrated in FIGS. 1, 2 and 3, in each case only the second duct compartment 33 is provided with outflow openings 31 and the first duct compartment is substantially closed, except for the passage openings 34 and the perforations 26. This offers the advantage that the medium supplied spreads along the length of the gassing duct in the first compartment while, in the meantime, the temperature is influenced (that is to say is increased or reduced) by the temperature of the part 30 of the panel-shaped body, which part acts as a partition, then flows to the second compartment via the perforations 26 in said part 30 which act as a partition, while, in the meantime, the temperature of the medium is influenced again, and then flows to the outflow openings via the second compartment, while the temperature of the medium is in this case too influenced again in the meantime.

The medium supply ducts 27 are provided along opposite edges of the panel-shaped body 21 and attached thereto. Thus, the heat exchanger can be produced as a modular unit, of which only the two medium supply ducts have to be connected upon installation. Furthermore, the feed line 23 and discharge line 24 for fluid are accommodated inside the medium supply ducts. In practice, this can be achieved relatively easily without the dimensions of the medium supply ducts having to increase substantially. After all, the fluid will generally be a fluid such as water, so that these lines 23 and 24 can be relatively small, compared to the supply duct for gaseous medium. Another advantage is the fact the medium supply duct thus protects the line 23 and/or 24 against damage and that the temperature of the medium can be influenced, if desired—by heating or cooling by means of the line 23 and/or 24—while it is flowing through the medium supply duct.

As can be seen in FIGS. 2 and 3, the interior 29 of each gassing duct 28 touches the exterior 38 of a fluid line 22, both at the top wall 35 and at the bottom wall 37. This improves the exchange of heat between the fluid and the medium.

According to a further embodiment, each gassing duct 28 of the heat exchanger 1 according to the invention is provided with a trough 40 having a first end 41 and a second end 42. These troughs 40 can be used for moisturization by filling them with a liquid, in particular water, and allowing it to evaporate. When used in a climate chamber containing birds, these troughs 40 can also be used as drinking troughs. In order to simplify the filling of the troughs 40 with liquid, the latter are in particular provided with an overflow 43 near the second end, and the troughs are staggered one above the other, in each case with the second end 42 of a trough 40 situated at a higher level above the first end 41 of a trough 40 situated at a lower level. The liquid can then be supplied at the first end 41 of the top trough, will then fill the top trough up to the filling level determined by the overflow, subsequently fill the trough situated underneath up to the filling level determined by the overflow thereof, etcetera, until the bottom trough is also filled. In order to ensure that the liquid flows to each subsequent trough and to prevent flooding, in case there is an obstacle in one trough, the first longitudinal top trough edge 44 is higher than the second longitudinal top trough edge 45, which is closer to the panel-shaped body 21, and the top wall 35 of the gassing duct 28 in each case continues up to the second longitudinal top trough edge 45. The liquid can then pass the obstacle via the top wall 35.

Referring to FIGS. 2 and 3, each gassing duct is furthermore provided, if desired, with a fastening means, such as a receiving slot 46, for attaching a lighting fixture 47 (illustrated only in FIG. 2). This fixture 47 is provided with a row comprising a plurality of lighting LEDs 48, 49 (LED=light-emitting diode). Here, several LEDs 49 are in each case directed towards the trough 40 underneath (directional arrow 80 in FIG. 2) in order to illuminate the latter. The applicant has found that if the troughs 40 are drinking troughs for poultry, in particular for chicks, it is advantageous if these LEDs emit red light. The birds can then easily find the drinking trough. Other LEDs 48 may be directed in various directions (directional arrows 81 and 82 in FIG. 2) in order to ensure even illumination and prevent blinding the birds.

The heat exchanger 1 according to the invention can be used in a climate chamber in an advantageous manner, in particular in a climate chamber for rearing animals, in particular very young animals, such as chicks less than 4 days old or of an age of 0 or 1 days. Such very young animals, such as in particular chicks, are not yet able to control their own body temperature very well. In order to rear them well, it is important that they are kept at a predetermined temperature, which is dependent on the type of animal, in particular during the initial phase after hatching (birth), and to control this temperature very accurately (that is to say with an accuracy of ±1° C., preferably with an accuracy of ±0.5° C., or with a greater accuracy, such as ±0.2° C. or less). According to the invention, the term climate chamber is particularly understood to mean a device having an interior space, which can control the temperature in and throughout this interior space with an accuracy of ±1° C., preferably with an accuracy of ±0.5° C., or with a greater accuracy, such as ±0.2° C. or less (that is to say, the greatest difference in temperature between two spots in said space will be at most the value of said 'accuracy').

Figure 4:
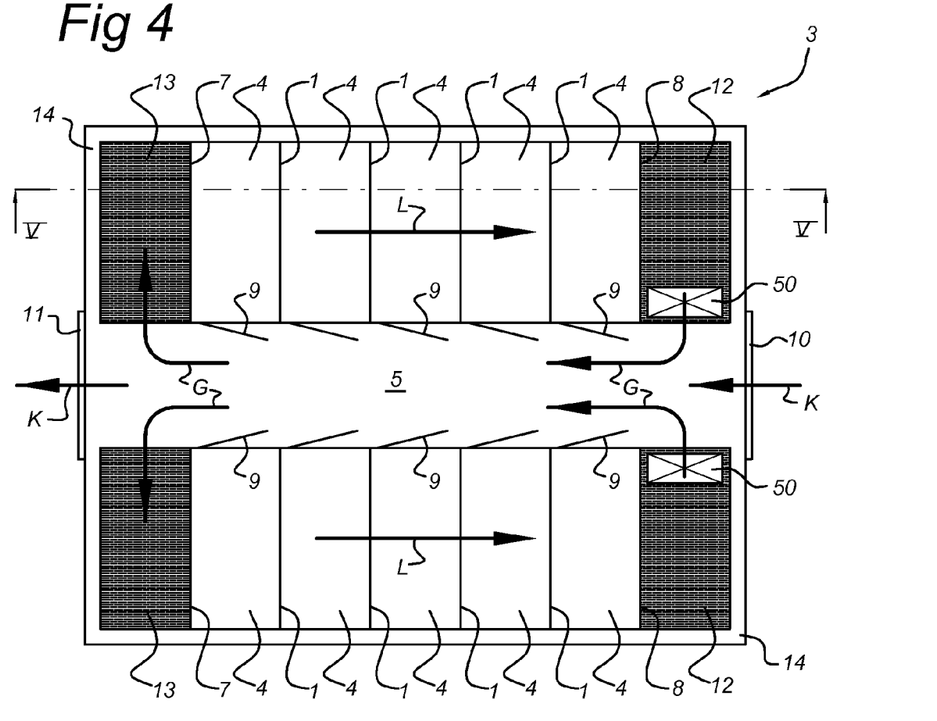
FIG. 4 shows a highly diagrammatic top view of a climate chamber according to the invention.
Figure 5:
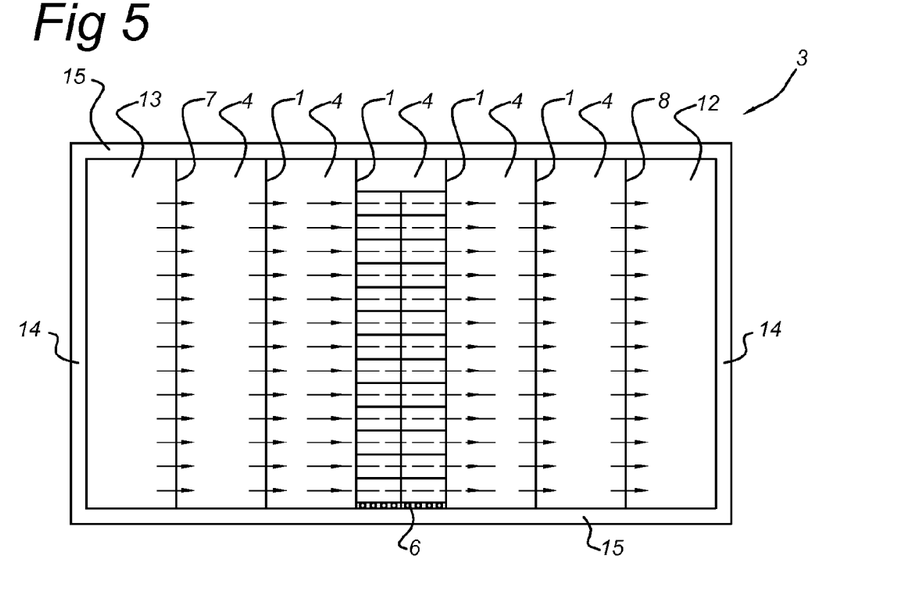
FIG. 5 shows a vertical view in longitudinal section of the climate chamber according to FIG. 4, which view in longitudinal section is taken along arrows V in FIG. 4.

FIGS. 4 and 5 highly diagrammatically show such a climate chamber 3, which in this case is in particular intended for rearing chicks which have just hatched. This climate chamber is delimited on the outside by thermally insulated side walls 14, a thermally insulated ceiling 16 and a floor 15, which is preferably also thermally insulated. The climate chamber 3 has at least one chamber compartment 4 in which the chicks are kept under conditioned circumstances. In the illustrated example, there are two rows with five chamber compartments 4 each. The rows are on either side of a corridor 5 and are accessible from the corridor 5 via doors 9. Entering and exiting the climate chamber 3 is possible by means of at least one door 10, 11. In this example, a door 10 is provided at one end of the corridor, which is intended in particular for entering the corridor 5 of the climate chamber, and a door 11 is provided at the other end which is intended in particular for exiting the corridor 5 of the climate chamber.

At one end of each row of chamber compartments 4 an inlet chamber 13 is in each case provided for introducing conditioned gas, such as air, into the upstream chamber compartment 4, and an outlet chamber 13 is in each case provided at the other end of each row of chamber compartments 4 for collecting gas coming from the downstream chamber compartment 4. Although it is not required, it is energetically advantageous subsequently to feed the gas from the outlet chamber 13 back to the inlet chamber. The gas may be fed back along the top of the chamber compartments, as is illustrated in WO 00/08922. However, this method requires a lot of space and it is more advantageous to feed the gas back via the corridor 5, as is indicated in FIG. 4 by means of arrows G. This leads to a significant reduction in the amount of space required. In addition, another result thereof is that the corridor 5 is also conditioned, albeit slightly less well than the chamber compartments 3, so that it is possible to open the door 9 of a chamber compartment during use while causing minimal disturbance to the climate.

In FIG. 4, the conveying stream of the products to be treated in the climate chamber, such as chicks, is indicated by means of arrows K. The products are preferably discharged via door 11 and the products are preferably supplied via door 10, 11 since the supply side can thus be kept relatively clean, which prevents contamination.

The chamber compartments of this climate chamber are provided with heat exchangers at opposite sides. The inflow side of the chamber compartment which is most upstream is in each case delimited by a heat exchanger 7, the outflow side of the most downstream chamber compartment is in each case delimited by a heat exchanger 8 and adjacent chamber compartments are in each case delimited with respect to one another by a heat exchanger 1. These heat exchangers 1, 7 and 8 may be substantially identical with respect to one another, but given the fact that the heat exchangers 7 and 8 only delimit a chamber compartment on one side, it will be clear to those skilled in the art that these heat exchangers 7 and 8 may also be of a different design, in particular on the side which is remote from the chamber compartment 4. The heat exchangers 1, 7 and 8 are of the kind which are composed of a panel-shaped body 21 provided with perforations 25 and 26, as well as with fluid lines 22. The gas stream through the chamber compartments and the perforations in the panel-shaped body 21 are in this case indicated by means of arrows L. Ventilation means 50, such as fans, in this case ensure that the gas stream is maintained. These ventilation means may as such be provided at various locations, but will usually be provided in the inlet chamber 12 and/or the outlet chamber 13.

As regards the climate chamber as described up to now with reference to FIGS. 4 and 5, it is not strictly necessary to provide the heat exchanger with gassing ducts, although this has a cumulative advantage.

Figure 6:
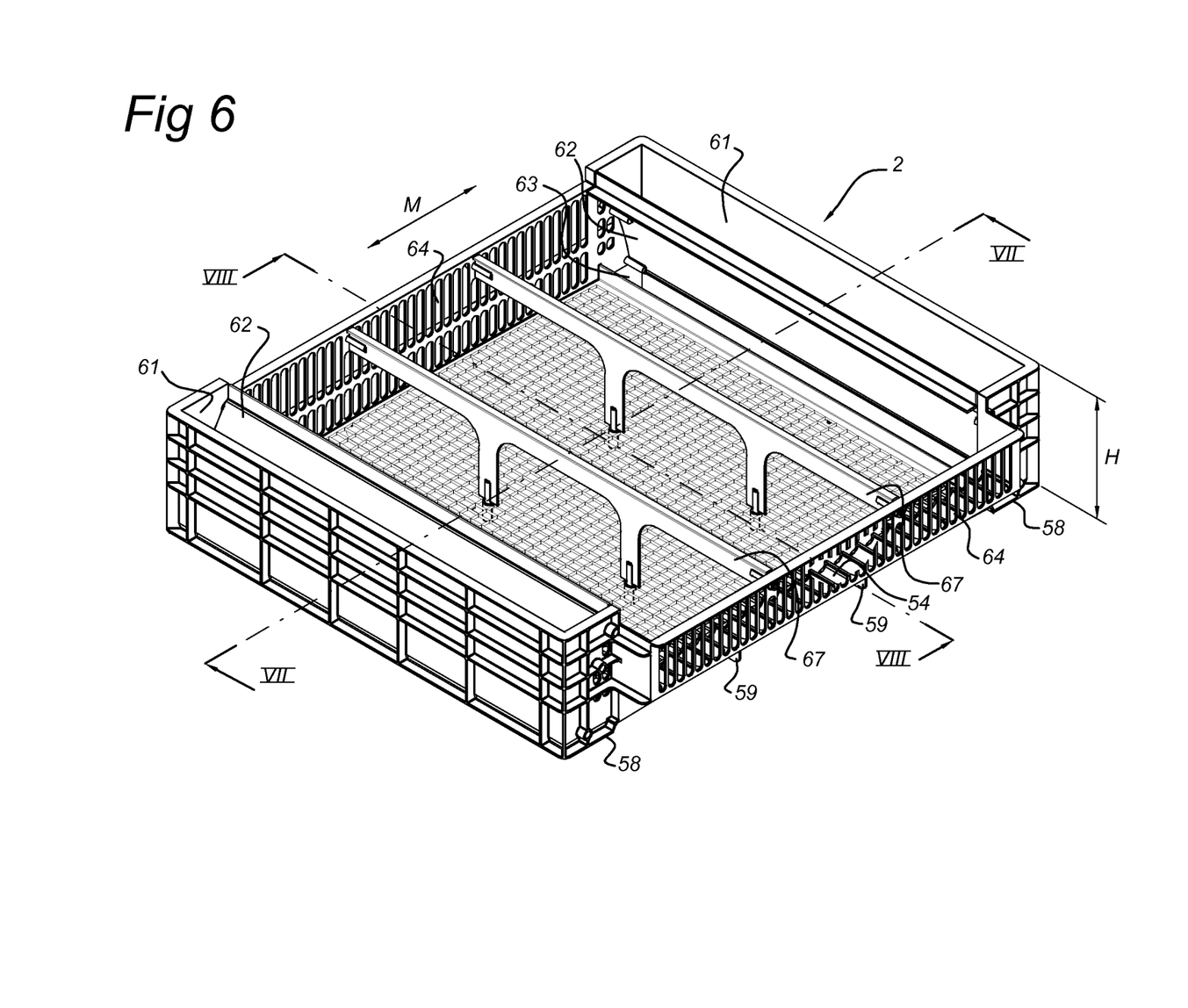
FIG. 6 shows a perspective view of a crate from the stack of crates as illustrated in FIG. 3.

As stated above, the climate chamber 3 according to the invention is in particular provided with heat exchangers 1, 7 and 8 as described in various further embodiments with reference to FIGS. 1, 2 and 3. 1, 2, 3 or more rows 6 of stacked crates 2 are placed in each chamber compartment. In particular, this will be 1 or 2 rows of stacks, such as two rows 6 of stacks, as illustrated diagrammatically in the central chamber compartment in FIG. 5. Depending on the depth, viewed at right angles to the plane of the drawing from FIG. 5, of each chamber compartment 4 and the length, viewed in the direction of double arrow M from FIG. 6, each row 6 of stacks of crates may comprise one or more stacks of crates.

Referring to FIGS. 6, 7, 8 and FIG. 3, if the heat exchangers 1, 7 and 8 are provided with drinking troughs 40, each crate preferably has a height H corresponding to the centre-to-centre distance C between the gassing ducts 28 and drinking troughs 40. Furthermore, the crate 2 is then provided with drinking passages 54 on one side, the side facing the drinking trough 40, so that the birds, in particular the chicks, can drink from a trough 40. These drinking passages 54 may be provided in a vertical side wall of the crate. However, it is particularly advantageous to provide that side of the crate 2 facing the drinking trough with, starting from the bottom, a bottom vertical wall part 51, a wall part 52 which is directed outwards from the top of the bottom vertical wall part 51, and a top wall part 53 which is directed vertically from the outer edge of the outwardly directed wall part 52. The outwardly directed wall part 52 of each crate 2 is in each case situated above a trough 40 and is provided with the drinking passages 54 which continue as far as just into the bottom vertical wall part 51 to increase drinking comfort. These drinking passages 54 are, on the one hand, dimensioned such that the birds can drink from the trough, but, on the other hand, cannot escape from the crate 2 via the drinking passage 54. The width E of the drinking passages is in this case approximately 22 mm, so that the chicks can stick their head through them, but their body is too large to pass through them. The bottom vertical wall part 51 forms a kind of railing which prevents the chicks from pushing each other as far as above the trough and ensures a correct drinking level. As an indication, for chicks of chickens, the bottom vertical wall part 51 may, in this case, have a height of approximately 50 mm to 55 mm and the top vertical wall part 53 may in this case have a height of approximately 90 mm to 110 mm.

In order to ensure that the gas stream A can permeate the crate 2 according to the invention, the crate 2 is provided with ventilation openings on two opposite sides—which are at right angles to the gas stream A—in order to allow the gas stream A to pass. These ventilation passages have a width F, see FIG. 7, which is such that the animals, in particular the chicks, cannot escape through them. The width F is preferably such that the animals cannot stick their head out of the crate here.

Figure 7:
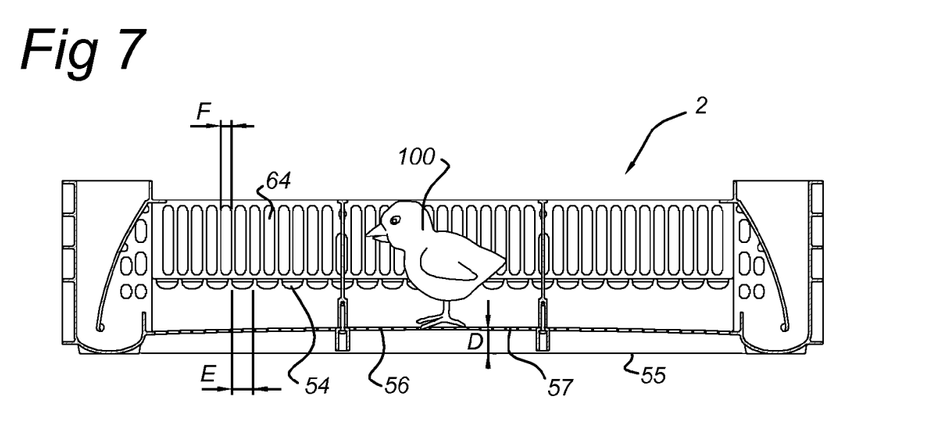
FIG. 7 shows a first vertical view in longitudinal section of the crate from FIG. 6, which view in longitudinal section is taken along arrows VII in FIG. 6.

In order to be able to feed the animals, such as the above-mentioned chicks, the crate 2 according to the invention is provided with a feeding trough 60. In order to allow the gas to flow through the crate 2 in a manner which is as unimpeded as possible, this feeding trough 60 is provided along a side of the crate 2 which is at right angles to the side along which the drinking trough 40, at least the drinking passages 54, are provided. The feeding trough 60 comprises, in a known manner, a partition 62 which separates the filling opening 61 from the feed opening 63 which is situated at a lower level. The feeding opening 63 of this embodiment will in particular be provided with elements transverse to the direction of the feeding opening 63 of the feeding trough 61. Thus, it will allow very small and very young chicks to climb out of the feeding opening 63. In an embodiment, transverse wall parts will be provided at mutual distances in said feeding trough. These wall parts are not indicated in the drawing. The wall parts will usually have an interspacing of about 2-4 cm.

Figure 8:
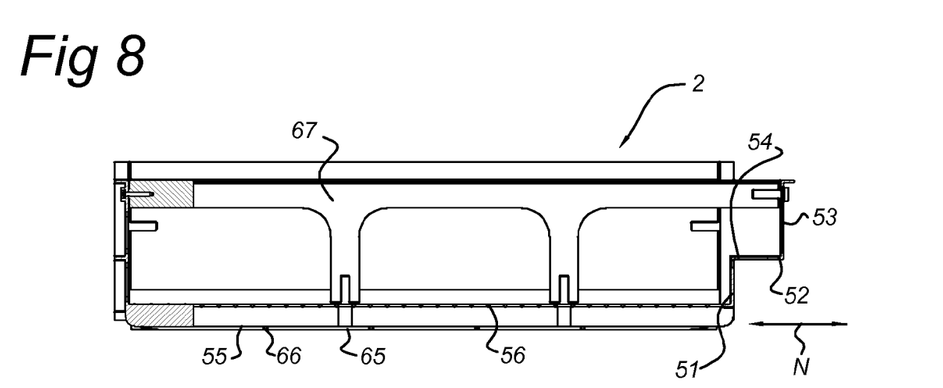
FIG. 8 shows a second vertical view in longitudinal section of the crate from FIG. 6, which view in longitudinal section is taken along arrows VIII in FIG. 6.

According to a further aspect of the invention, the bottom of the crates is designed as a grate 56 with a removable baseplate 55 fitted underneath. This baseplate is advantageously made of a material containing cellulose, such as cardboard. The baseplate 55 can then be recycled and be disposed of together with the droppings as a disposable product. More generally, it is advantageous according to the invention if the baseplate is made from a biodegradable material, such as a biodegradable plastic or biodegradable cardboard. This baseplate 55 is in particular provided at a distance D of 5 mm to 50 mm underneath the grate 56. Referring to FIG. 8, this baseplate 55 can be placed in the crate and removed from the crate by sliding in accordance with the double arrow N. To this end, the crate 2 is provided with two ribs 65 and 66 on the underside, between which there is a slot in which the opposite edges of the baseplate can be accommodated. When stacked, the supports 67 of a crate 2 underneath in each case provide support to the baseplate 55 of a crate 2 above. The underside of the grate is particular designed to be convex towards the top. In order to be able to move this crate 2 safely over a conveyor belt without a baseplate 55 but with chicks 100 or other animals without damaging the legs or toes of the animals, it is advantageous according to the invention if the crate 2 is provided on the underside with supporting feet 58, which ensure that there is a minimum distance D of 5 to 15 mm between the underside of the grate 56 and the surface. In order to prevent the grate from sagging, it is provided with reinforcing ribs 59 on the underside.

In particular, in the current invention, a surface layer of sheet of biodegradable material is provided on top of the grate 56. As the chicks of the current invention just after hatching, in the first and sometimes even the second day are very small, their feet may get stuck in the grates 56. The surface sheet will remain just long enough to prevent problems. The room between the grates 56 should not be too small as otherwise the droppings of the animals will not fall through.

It should be noted that a stack of crates for young animals, such as chicks, described in this paragraph, forms a further invention by itself for which the Applicant reserves all rights. This further invention may, independently of what else has been described in this application in respect of the crate, be characterized as: Stack comprising a plurality of crates, optionally containing animals, such as chicks, each crate having a bottom which is designed as a grate 56 having a removable baseplate 55 fitted underneath for collecting droppings. The further invention furthermore relates to an individual crate, as described above in this paragraph. As stated above, the Applicant reserves all rights with respect to such a stack of crates and with respect to such an individual crate, such as the right to file a divisional patent application.

It will also be clear that the above description and drawings are included to illustrate some embodiments of the invention, and not to limit the scope of protection. Starting from this disclosure, many more embodiments will be evident to a skilled person which are within the scope of protection and the essence of this invention and which are obvious combinations of prior art techniques and the disclosure of this patent.

LIST OF REFERENCE NUMERALS

1=heat exchanger
2=crate
3=climate chamber
4=(chamber) compartment in climate chamber
5=corridor in climate chamber
6=stack of crates
7=heat exchanger
8=heat exchanger
9=door
10=door
11=door
12=inlet chamber
13=outlet chamber
14=vertical outside wall of climate chamber
15=floor of climate chamber
16=ceiling of climate chamber
21=panel-shaped body
22=fluid line
23=fluid feed line
24=fluid discharge line
25=perforation
26=perforation
27=medium supply duct
28=gassing duct
29=interior of gassing duct
30=part of panel-shaped body touching the interior of the gassing duct
31=outflow opening
32=first duct compartment
33=second duct compartment
34=passage opening from medium supply duct to first duct compartment
35=top wall first and second duct compartment
36=side wall first/second duct compartment
37=bottom wall first and second duct compartment
38=exterior of fluid line
39=intermediate zone of panel-shaped body, situated between gassing ducts
40=trough
41=first end of trough
42=second end of trough
43=overflow
44=first longitudinal trough edge
45=second longitudinal trough edge
46=attachment slot for lighting fixture
47=lighting fixture
48=LED
49=LED directed at trough
50=ventilation means 51=bottom vertical wall part
52=outwardly directed wall part
53=top vertical wall part
54=(drinking) passage
55=baseplate
56=grate
57=upper side/underside of grate/baseplate
58=supporting foot
59=supporting foot
60=feeding trough
61=filling opening of feeding trough
62=partition of feeding trough
63=feed opening of feeding trough
64=ventilation passage
65=rib
66=rib
67=support
100=chick
A=gas stream
B=distance between gassing ducts
C=centre-to-centre distance between gassing ducts
D=intermediate space between baseplate and grate
E=width of drinking passage
F=width of ventilation passage
G=arrows indicating the feeding back of the gas stream
H=height of crate
K=arrows indicating the conveying direction of products
L=arrows indicating the gas stream through the chamber compartments and perforations in the heat exchanger
M=double arrow indicating the longitudinal direction of a crate
N=double arrow indicating the sliding in/out of the baseplate

The invention claimed is:

1. A method for brooding poultry, comprising:
 (a) collecting eggs of the first 3-5 layings of young hens;
 (b) incubating the eggs and hatching them together to obtain chicks;
 (c) providing the chicks in crates of about 10-500 animals directly after hatching;
 (d) arranging the crates in stacks in an incubator chamber;
 (e) providing food and drink to the chicks in the incubator chamber, and
 (f) controlling the temperature, humidity, $CO_2$ level and flow rate of air in the incubator chamber.

2. The method of claim 1, wherein the hens are younger than 29 weeks old.

3. The method of claim 1, wherein the hens are between 26 and 29 weeks old.

4. The method of claim 1, wherein the temperature is set at about 1-3° C. above a usual temperature for hatching chicks from eggs.

5. The method of claim 1, wherein the temperature is initially set at about 36.4-37.4° C. and lowered to about 28.9-29.9° C. over about 108 hours.

6. The method of claim 1, wherein the temperature is set according to table below:

| T(h) after hatching | Temperature (° C.) |
|---|---|
| 0 | 36.4-37.4 |
| 6 | 36.4-37.3 |
| 12 | 36.2-37.2 |
| 24 | 35.6-36.6 |
| 36 | 34.8-35.8 |
| 48 | 33.7-34.7 |
| 60 | 32.6-33.6 |
| 72 | 31.4-32.4 |
| 84 | 30.3-31.3 |
| 96 | 29.5-30.5 |
| 108 | 28.9-29.9. |

7. The method of claim 1, wherein the temperature is set according to the table below:

| T(h) after hatching | Temperature (° C.) |
|---|---|
| 0 | 36.7-37.1 |
| 6 | 36.7-37.1 |
| 12 | 36.5-36.9 |
| 24 | 35.9-36.3 |
| 36 | 35.1-35.5 |
| 48 | 34.0-34.4 |
| 60 | 32.9-33.3 |
| 72 | 31.7-32.1 |
| 84 | 30.6-31.0 |
| 96 | 29.8-30.2 |
| 108 | 29.2-29.6. |

8. The method of claim 1, wherein the eggs have a weight of below the usual weight of eggs.

9. The method of claim 1, wherein the hens are broiler hens and the eggs have a weight below about 50 gram.

10. The method of claim 1, wherein the crates comprise a bottom designed as a grate and have a biodegradable sheet on a surface of the grate for providing a walking surface for the chicks.

11. The method of claim 10, wherein the biodegradable sheet comprises cellulose material and is degraded between the first and second day after the chicks are provided in the crate.

12. The method of claim 1, wherein the crates comprise a bottom designed as a grate having openings of about 0.7 to 1.2 cm×1.3-1.8 cm.

13. The method of claim 1, wherein the crates comprise a feeding trough provided along at least one of the sides of the crates, and wherein the feeding trough is provided with transverse wall parts for allowing the chicks to climb out of the feeding trough.

14. A method for growing poultry, comprising:
 (a) directly after hatching, providing hatched chicks in crates of about 10-500 animals;
 (b) arranging the crates in stacks in an incubator chamber;
 (c) providing food and drink to each crate in the incubator chamber, and
 (d) controlling the temperature, humidity, $CO_2$ level and flow rate of air in the incubator chamber;
 (e) keeping the chicks for 4-10 days after hatching in the incubator chamber; and
 (f) transferring the chicks from the incubator chamber to a broiler house.

15. The method of claim 14, wherein a temperature in the broiler house is kept more than 1° C. lower than a usual temperature.

16. The method of claim 15, wherein the temperature in the broiler house is kept more than 2° C. below the usual temperature.

17. The method of claim 14, wherein the temperature in the broiler house is initially at about 30-33° C.

18. The method of claim 17, wherein the initial temperature is lowered to about 19-22° C. over 21 days.

19. The method of claim 17, wherein the temperature is lowered about 0.5° C. per day to about 20-21° C.

20. The method of claim 14, wherein the initial temperature of the incubator chamber is at about 36.6-37.2° C., and selectively lowered to about 28.0-28.6° C. at about a linear rate.

* * * * *